US012042937B2

(12) United States Patent
Inaba (10) Patent No.: US 12,042,937 B2
(45) Date of Patent: Jul. 23, 2024

(54) ROBOT PROGRAMMING DEVICE AND ROBOT PROGRAMMING METHOD

(71) Applicant: FANUC CORPORATION, Yamanashi (JP)

(72) Inventor: Gou Inaba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 259 days.

(21) Appl. No.: 16/985,683

(22) Filed: Aug. 5, 2020

(65) Prior Publication Data

US 2021/0060772 A1 Mar. 4, 2021

(30) Foreign Application Priority Data

Aug. 28, 2019 (JP) ................................ 2019-155623

(51) Int. Cl.
*B25J 9/16* (2006.01)

(52) U.S. Cl.
CPC ........... *B25J 9/1658* (2013.01); *B25J 9/1664* (2013.01)

(58) Field of Classification Search
CPC ...... B25J 9/1658; B25J 9/1664; B25J 9/1602; B25J 9/161; B25J 9/1661; B25J 9/1656; B25J 9/16; G05B 2219/40392; G05B 2219/13144; G05B 2219/40099; G06F 3/048; G06F 3/0486; G06F 8/34
See application file for complete search history.

(56) References Cited

U.S. PATENT DOCUMENTS

2007/0150102 A1* 6/2007 Park .......................... G06F 8/34
700/245
2012/0317535 A1* 12/2012 Schmirgel .......... G05B 19/0426
717/100
(Continued)

FOREIGN PATENT DOCUMENTS

JP          2000-155606         6/2000
JP          2001-353678 A       12/2001
(Continued)

OTHER PUBLICATIONS

Noriaki Mitsunaga, aiBlocks: A Visual Programming Environment on a Tablet PC to Write a Micro Controller's Program, the Journal of the Information Processing Society of Japan (transaction) education and a computer (TCE) vol. 3 No. 1 [online], Japan, Information Processing Society of Japan, Feb. 22, 2017, the 3rd vol. No. 1, pp. 53-63, 11 pages.
(Continued)

*Primary Examiner* — Adam R Mott
*Assistant Examiner* — Matthew C Gammon
(74) *Attorney, Agent, or Firm* — Wenderoth, Lind & Ponack, L.L.P.

(57) ABSTRACT

To generate an easy-to-understand program for a robot in a simple way. A robot programming device performs programming using an operation unit block. The robot programming device includes a display control unit that displays a programming region and an advanced setting region on a display unit. The programming region is a region for programming for running the robot by setting an operation unit block defined for each operation unit of the robot. The advanced setting region is a region for making setting relating to the operation unit block.

4 Claims, 8 Drawing Sheets

(56) References Cited

U.S. PATENT DOCUMENTS

| | | | |
|---|---|---|---|
| 2014/0277743 A1* | 9/2014 | Hart | B25J 9/1661 |
| | | | 700/264 |
| 2016/0284232 A1* | 9/2016 | Sisamos | G05B 19/0426 |
| 2018/0029232 A1* | 2/2018 | Ouchi | B25J 9/1671 |
| 2018/0285084 A1* | 10/2018 | Mimlitch, III | G06F 11/3604 |
| 2019/0183591 A1* | 6/2019 | Johnson | G06F 3/04845 |

FOREIGN PATENT DOCUMENTS

| | | |
|---|---|---|
| JP | 2016-137542 | 8/2016 |
| JP | 2019-126895 A | 8/2019 |

OTHER PUBLICATIONS

Notification of Reasons for Refusal mailed Apr. 11, 2023 in JP Patent Application No. JP2019-155623, with Machine translation, 9 pages.

* cited by examiner

1. MOVE POSITION1 speed= 100
2. MOVE POSITION2 speed= 100
3. Hand Close
4. MOVE POSITION3 speed= 100
5. MOVE POSITION4 speed= 1000
6. MOVE POSITION5 speed= 100
7. Hand Open
8. MOVE POSITION6 speed= 100

ROBOT PROGRAMMING DEVICE AND ROBOT PROGRAMMING METHOD

This application is based on and claims the benefit of priority from Japanese Patent Application No. 2019-155623, filed on 28 Aug. 2019, the content of which is incorporated herein by reference.

BACKGROUND OF THE INVENTION

Field of the Invention

The present invention relates to a robot programming device and a robot programming method.

Related Art

For running a robot, a program written in a programming language in a text format is required to be generated in advance using a teach pendant or a personal computer, for example. For generation of the program, however, consideration is required to be given to the motion of the robot responsive to each command written in the programming language. Such generation may be difficult for a user unskilled in programming.

According to a known technique responsive to this issue, a program for a robot is generated using a block describing a program for each motion of the robot. See patent documents 1 and 2, for example.

Patent Document 1: Japanese Unexamined Patent Application, Publication No. 2000-155606
Patent Document 2: Japanese Unexamined Patent Application, Publication No. 2016-137542

SUMMARY OF THE INVENTION

Figure 1A:
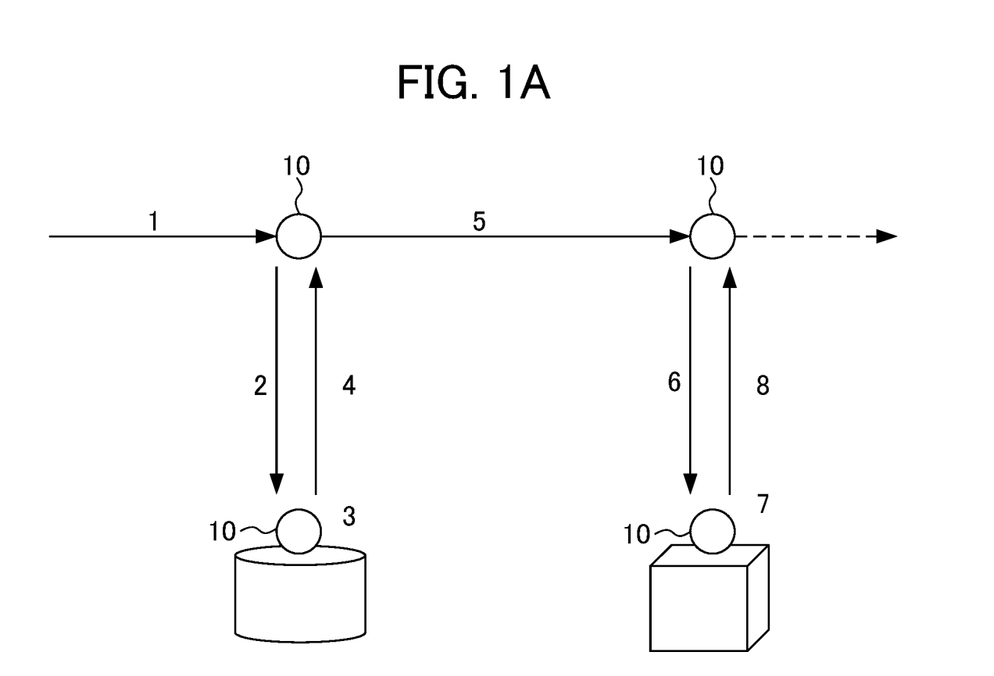
FIG. 1A shows exemplary motions to be made by a robot.
Figure 1B:
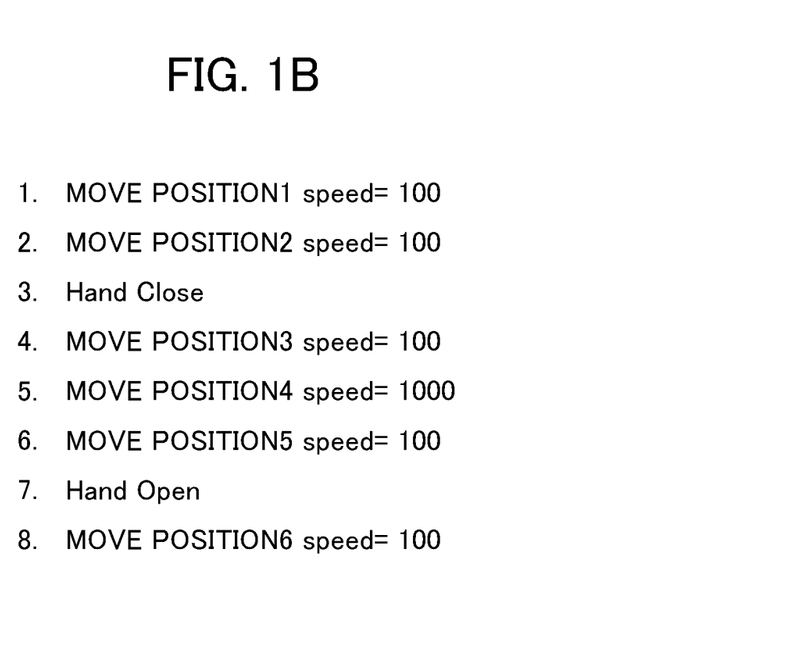
FIG. 1B shows an example of a conventional program in a text format for teaching the motions in FIG. 1A to a robot.
Figure 2:
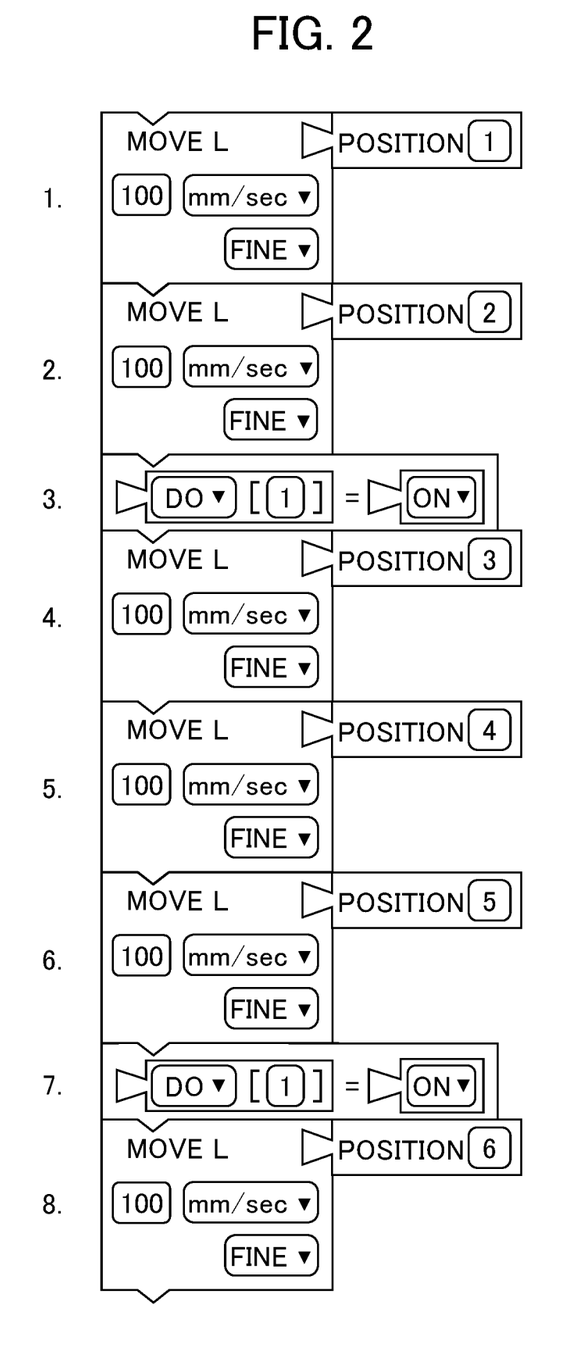
FIG. 2 shows an example of replacement of the program in a text format shown in FIG. 1B with a block program.

As shown in FIGS. 1A to 2, replacing the program in a text format with a block program requires a huge number of blocks, and this may degrade the visibility of the program.

FIG. 1A shows exemplary motions to be made by a robot. FIG. 1A shows the following motions 1 to 8 to be made, for example. 1. Move the robot to an approach position "POSITION1." 2. Move the robot to a workpiece position "POSITION2." 3. Close a robot hand (grasp a workpiece 10). 4. Move the robot to a retreat position "POSITION3." 5. Move the robot to an approach position "POSITION4." 6. Move the robot to a workpiece installation position "POSITION5." 7. Open the robot hand (release the workpiece 10). 8. Move the robot to a retreat position "POSITION6." A sequence of the motions shown in FIG. 1A corresponds to the motion of loading the workpiece 10 on a machine tool or unloading the workpiece 10 from the machine tool, for example.

FIG. 1B shows an example of a conventional program in a text format for teaching the motions in FIG. 1A to a robot. Programs in rows of FIG. 1B from a first row to an eighth row correspond to the motions 1 to 8 respectively in FIG. 1A. Namely, the programs in FIG. 1B are composed of six operation statements and two hand open/close instructions.

FIG. 2 shows an example of replacement of the program in a text format shown in FIG. 1B with a block program. The programs from the first program to the eighth program in FIG. 2 correspond to the programs in the rows in FIG. 1B from the first row to the eighth row. Namely, each block in FIG. 2 is defined on the basis of a motion indicated by a program instruction (MOVE, for example) in a text format in each row of FIG. 1B or on the basis of a logic unit in the program instruction.

"MOVE L," which is shown in blocks corresponding to first, second, fourth to sixth, and eighth program instructions, indicates a code for moving a robot hand to "POSITION1," for example, by linear interpolation. "FINE" is a code for advancing to a next block after completion of positioning is determined.

As shown in FIG. 2, setting indicating a move position such as "POSITION1" is made by connecting a setting block. Instead of using the setting block, setting of a move position, etc., may be made by describing a move velocity such as "100" or "FINE" in a block. Setting indicating a move velocity such as "100" may be made by connecting the setting block.

As shown in FIG. 2, however, regarding a block program defined for each program instruction, the visibility of the program is degraded in response to increase in the number of blocks and the number of items to be set in a block.

Hence, generating an easy-to-understand program for a robot in a simpler way has been desired in programming using a block.

One aspect of a robot programming device of this disclosure is a robot programming device that performs programming using an operation unit block that is a block defined for each operation unit of a robot. The robot programming device includes a display control unit that displays a programming region and an advanced setting region on a display unit. The programming region is a region for programming for running the robot by defining the motion of the robot on the basis of an operation unit, and setting an operation unit block corresponding to the operation unit. The advanced setting region is a region for making setting relating to the operation unit block.

One aspect of a robot programming method of this disclosure is a robot programming method of performing programming using an operation unit block that is a block defined for each operation unit of a robot. The method is implemented by a computer including a display unit and includes: a step of displaying a programming region and an advanced setting region on the display unit; a step of defining the motion of the robot on the basis of an operation unit and setting an operation unit block corresponding to the operation unit in the programming region; and a step of inputting setting relating to the operation unit block set in the programming region to the advanced setting region.

According to the one aspect, an easy-to-understand program for a robot can be generated in a simpler way in programming using a block.

DETAILED DESCRIPTION OF THE INVENTION

An embodiment will be described below using drawings.

Configuration of Embodiment

Figure 3:
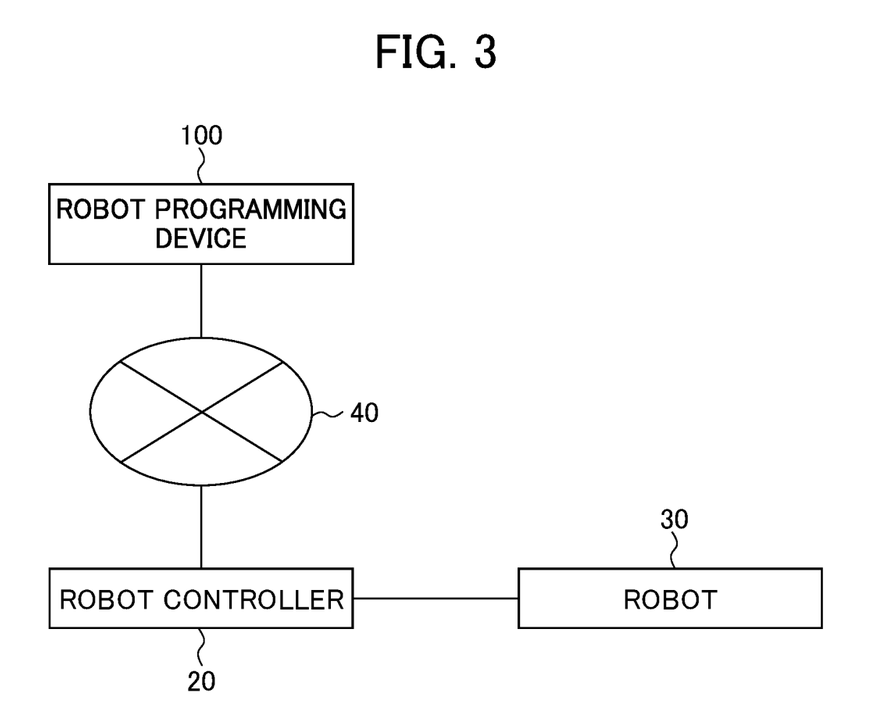
FIG. 3 shows an example of the configuration of a robot control system according to an embodiment.

FIG. 3 shows an example of the configuration of a robot control system according to the embodiment. As shown in FIG. 3, the robot control system includes a robot programming device 100, a robot controller 20, and a robot 30.

The robot programming device 100 and the robot controller 20 may be connected to each other through a predetermined network 40 such as a local area network (LAN) or the Internet. The robot controller 20 and the robot 30 may communicably be connected to each other through a wire or without a wire. The robot programming device 100, the robot controller 20, and the robot 30 each include a communication unit not shown for mutually communicating with each other through such connections.

The robot programming device 100 is an electronic device such as a personal computer or a tablet, for example, and generates a program for controlling the motion of the robot 30 by the robot controller 20. The robot programming device 100 outputs the generated program to the robot controller 20 through the network 40. Alternatively, in an offline configuration in the absence of communicable connection, after generating a program, the robot programming device 100 may store the generated program into a storage medium, and the robot controller 20 may input the generated program through the storage medium, for example. The robot controller 20 may include the robot programming device 100, as described later.

Each functional block in the robot programming device 100 will be described later in detail.

The robot controller 20 is a controller (also called a "robot controller") that analyzes the program generated by the robot programming device 100 and controls the motion of the robot 30.

The robot 30 is a robot that makes a motion on the basis of control by the robot controller 20. The robot 30 drives a movable part such as an end effector that may be an arm or a hand on the basis of the control by the robot controller 20. The robot 30 can be realized using a general industrial robot used in a factory of producing automobiles or electronic parts, for example.

With the foregoing configuration, the robot programming device 100 generates a motion program for running the robot 30.

<Functional Block in Robot Programming Device 100>

Functional blocks provided in the robot programming device 100 will be described next.

Figure 4:
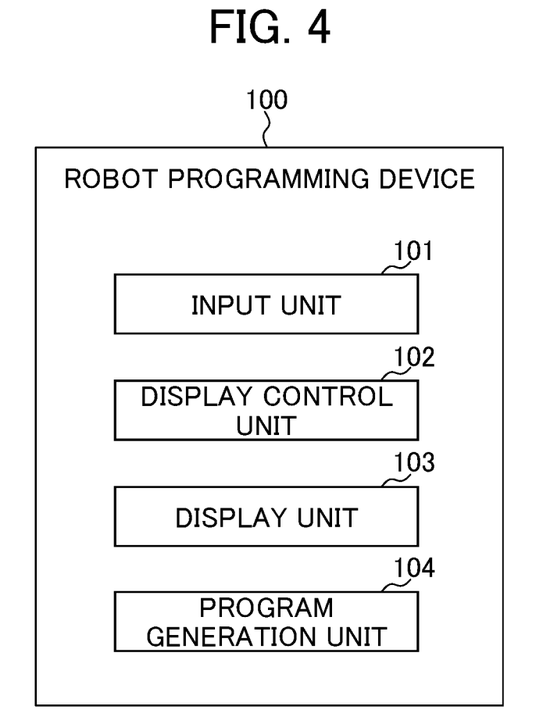
FIG. 4 is a functional block diagram showing an example of a functional configuration of a robot programming device in FIG. 3.

FIG. 4 is a functional block diagram showing an example of a functional configuration of the robot programming device 100 in FIG. 3.

As shown in FIG. 4, the configuration of the robot programming device 100 includes an input unit 101, a display control unit 102, a display unit 103, and a program generation unit 104.

To realize the motions of the functional blocks in FIG. 4, the robot programming device 100 includes an operational processor such as a central processing unit (CPU) not shown. The robot programming device 100 further includes an auxiliary storage device such as a read-only memory (ROM) or a hard disk drive (HDD) not shown storing various types of control programs, and a main storage device such as a random access memory (RAM) not shown for storing data required temporarily for execution of the programs by the operational processor.

In the robot programming device 100, the operational processor reads an OS and application software from the auxiliary storage device. On the basis of the read OS and application software, the operational processor performs operational processing while expanding the OS and the application software on the main storage device. On the basis of a result of the operation, the robot programming device 10 controls each hardware. By doing so, processes by the functional blocks in FIG. 4 are realized. Namely, the robot programming device 100 can be realized by causing hardware and software to work collaboratively.

The input unit 101 is realized by an input device such as a keyboard and a mouse or a touch panel, for example. The input unit 101 accepts input of a block of an operation unit described later, input of a setting item relating to the operation unit, and various types of operations from a user.

More specifically, instead of a block defined for each motion indicated by an instruction for the robot 30 shown FIG. 2 (MOVE, for example) or for each logic unit in a program instruction, for example, the input unit 101 accepts input of an operation unit block defined on the basis of an operation unit such as "grasp" or "release." While the input unit 101 accepts input of the operation unit block such as "grasp," the input unit 101 further accepts input of teaching (setting) indicating the workpiece position "POSITION2" in which the workpiece 10 to be grasped by the robot 30 is arranged, as shown in FIG. 1B. The program input in this way is output to the program generation unit 104. Programming using the operation unit block will be described in detail by referring to FIG. 5.

In the following, unless otherwise specified, the operation unit will also be called an "operation unit" or a "block" simply.

When the display control unit 102 receives an instruction to start programming on the basis of input operation from a user through the input unit 101, for example, the display control unit 102 displays a user interface on the display unit 103 for accepting input of a block of the operation unit described later, input of a setting item relating to the operation unit, and various types of operations from the user. The displayed user interface has a programming region for setting of an operation unit block for running the robot 30, and an advanced setting region for making setting (teaching) relating to the operation unit block. The display control unit 102 and the user interface will be described in detail by referring to FIG. 5.

The display unit 103 is realized by a liquid crystal display, for example. The foregoing user interface is displayed on the display unit 103 on the basis of an instruction from the display control unit 102.

On the basis of an operation unit block set in the programming region and setting content in the block set in the advanced setting region of the user interface, the program generation unit 104 generates a motion program for running the robot 30, for example, the program in a standard format (text format) shown in FIG. 1B. The motion of the program generation unit 104 will be described later.

Then, the robot programming device 100 transmits the generated motion program to the robot controller 20. The robot controller 20 controls the motion of the robot 30 on the basis of the received motion program. More specifically, the robot controller 20 generates a signal for controlling the motion of the robot 30 on the basis of the received motion program, and outputs the generated signal to the robot 30. In response to the output signal, the robot 30 drives a movable part such as an end effector that may be an arm or a hand. This allows the robot 30 to do predetermined works in predetermined order by following the motion program.

As a result of collaborative work between the foregoing functional blocks, it becomes possible to set a block of an operation unit and set a setting item relating to the operation unit to generate a motion program, and to control the motion of the robot 30 using the robot controller 20.

<User Interface>

The user interface and input operation through the user interface will be described next.

Figure 5:
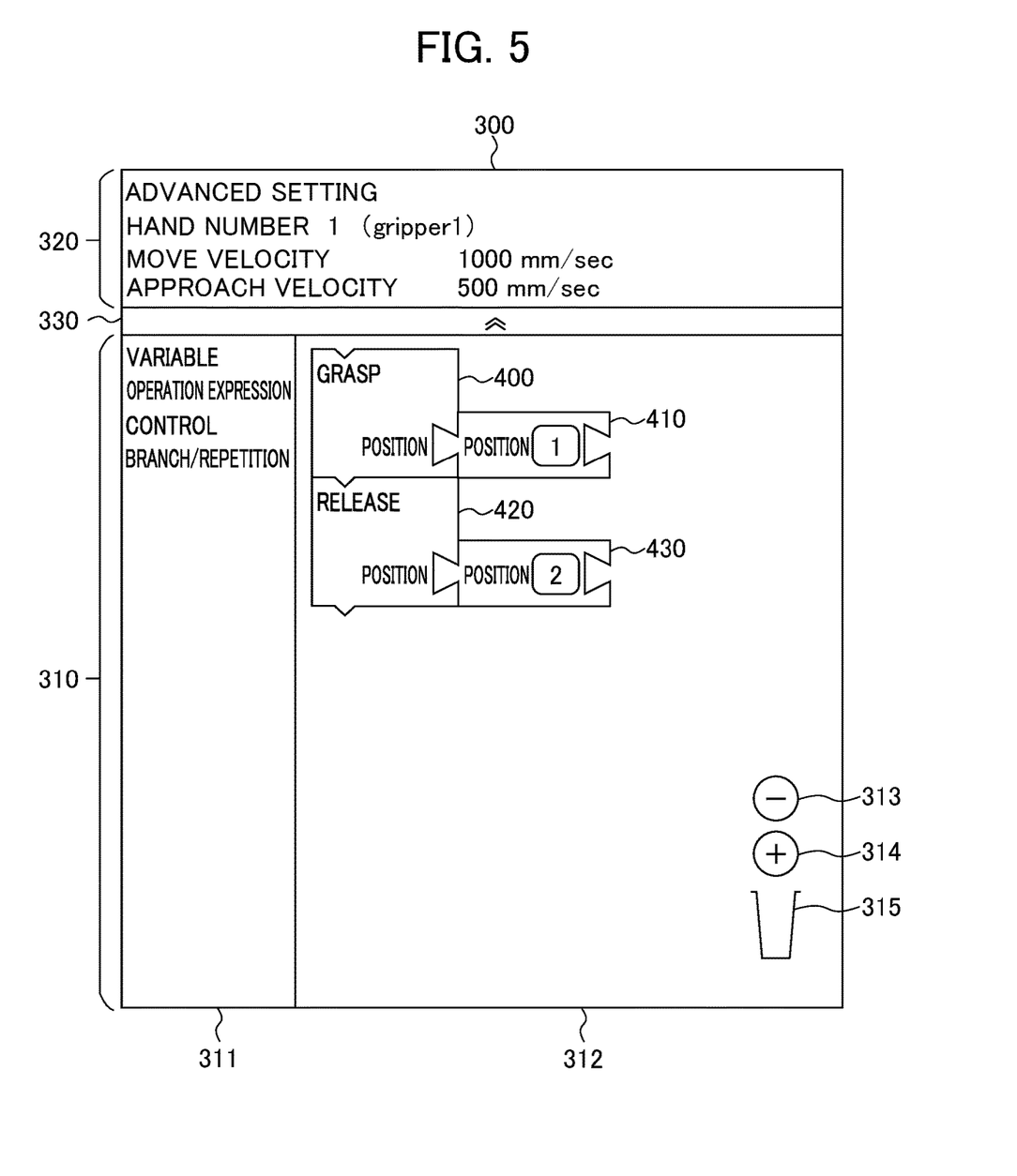
FIG. 5 shows an example of a user interface displayed on a display unit in FIG. 4.

FIG. 5 shows an example of a user interface 300 displayed on the display unit 103 in FIG. 4.

As shown in FIG. 5, the user interface 300 has a programming region 310, an advanced setting region 320, and a setting display switching region 330, for example.

The programming region 310 may have a library region 311 and a block teaching region 312.

In the library region 311, in response to input operation from a user through the input unit 101, a block required for programming is displayed for each of libraries such as "variable," "operation expression," "control," and "branch/repetition." If "variable" is selected, for example, a list of blocks for causing input of a variable for setting a motion in a block is displayed in the library region 311. If "operation expression" is selected, a list of blocks for performing operational processing such as four arithmetic operations is displayed in the library region 311. If "control" is selected, a list of operation unit blocks such as "grasp" and "release" as the motion of the robot 30 is displayed in the library region 311. If "branch/repetition" is selected, a list of blocks such as IF statements and DO statements is displayed in the library region 311.

The robot programming device 100 stores metadata about template blocks for each of the libraries including "variable" and "control" in advance into the foregoing auxiliary storage device not shown such as a ROM or an HDD.

The block teaching region 312 is a region in which input of programming is accepted using a block displayed in the library region 311. The displayed block teaching region 312 has a zoom-out button 313 for reducing the display of a block input to the block teaching region 312, a zoom-in button 314 for enlarging the display, and a trash 315 for deleting a block input to the block teaching region 312, for example. Icons other than these buttons may be prepared. In FIG. 5, operation unit blocks corresponding to the programs in FIG. 1B are input to the block teaching region 312.

As a specific example, in response to input operation from a user through the input unit 101, the library "control" is selected, and an operation unit block 400 corresponding to the operation "grasp" is dragged and dropped into the block teaching region 312, thereby setting this block in the block teaching region 312. Then, in response to input operation from the user through the input unit 101, the library "variable" is selected, and a block 410 relating to a position is dragged and dropped into the block teaching region 312 in such a manner as to be connected to the operation unit block 400 corresponding to the operation "grasp," thereby setting the block 400 corresponding to the operation "grasp."

The block 400 corresponding to the operation "grasp" is an operation unit block as a group of the programs in the rows from the first row to the fourth row in FIG. 1B (blocks from the first block to the fourth block in FIG. 2). A position "1" set in the block 410 is the workpiece position "POSITION2" where the workpiece 10 to be grasped by the robot 30 is arranged, for example.

Next, in response to input operation from the user through the input unit 101, the library "control" is selected, and an operation unit block 420 corresponding to the operation "release" is dragged and dropped into the block teaching region 312, thereby setting this block. Then, in response to input operation from the user through the input unit 101, the library "variable" is selected, and a block 430 relating to a position is dragged and dropped into the block teaching region 312 in such a manner as to be connected to the block 420 corresponding to the operation "release," thereby setting the block 420 corresponding to the operation "release."

The block 420 corresponding to the operation "release" is an operation unit block as a group of the programs in the rows from the fifth row to the eighth row in FIG. 1B (blocks from the fifth block to the eighth block in FIG. 2). A position "2" set in the block 430 is the workpiece installation position "POSITION5" where the robot 30 grasping the workpiece 10 is to release the workpiece 10, for example.

The advanced setting region 320 is a region in which setting is made in relation to an operation unit block selected from the operation unit blocks 400 and 420 input to the block teaching region 312 in response to input operation from the user through the input unit 101, and content in the resultant setting is displayed. As shown in FIG. 5, if the block 400 corresponding to the operation "grasp" is selected, for example, an interface is displayed in the advanced setting region 320 for setting a hand number at "1," setting a move velocity at "1000 mm/sec," and setting an approach velocity at "500 mm/sec."

Setting to be made in the advanced setting region 320 may include a move position or an approach distance, for example. Namely, the position "1" in the block 410 and the position "2" in the block 430 may be set in the advanced setting region 320. Like the position "1," however, if displaying positions together with the operation unit blocks 400 and 420 provides better understanding of the motions in the blocks, these positions may be set using the blocks 410 and 430 as shown in FIG. 5, for example.

The setting display switching region 330 is used for switching between display and hiding of the advanced setting region 320 in response to input operation from a user through the input unit 101.

More specifically, if input operation from the user through the input unit 101 swipes the setting display switching region 330 upward, for example, the display control unit 102 hides the advanced setting region 320. If the setting display switching region 330 is swiped downward, for example, the display control unit 102 displays the advanced setting region 320. By doing so, the block teaching region 312 can be displayed in a wider area.

Figure 6:
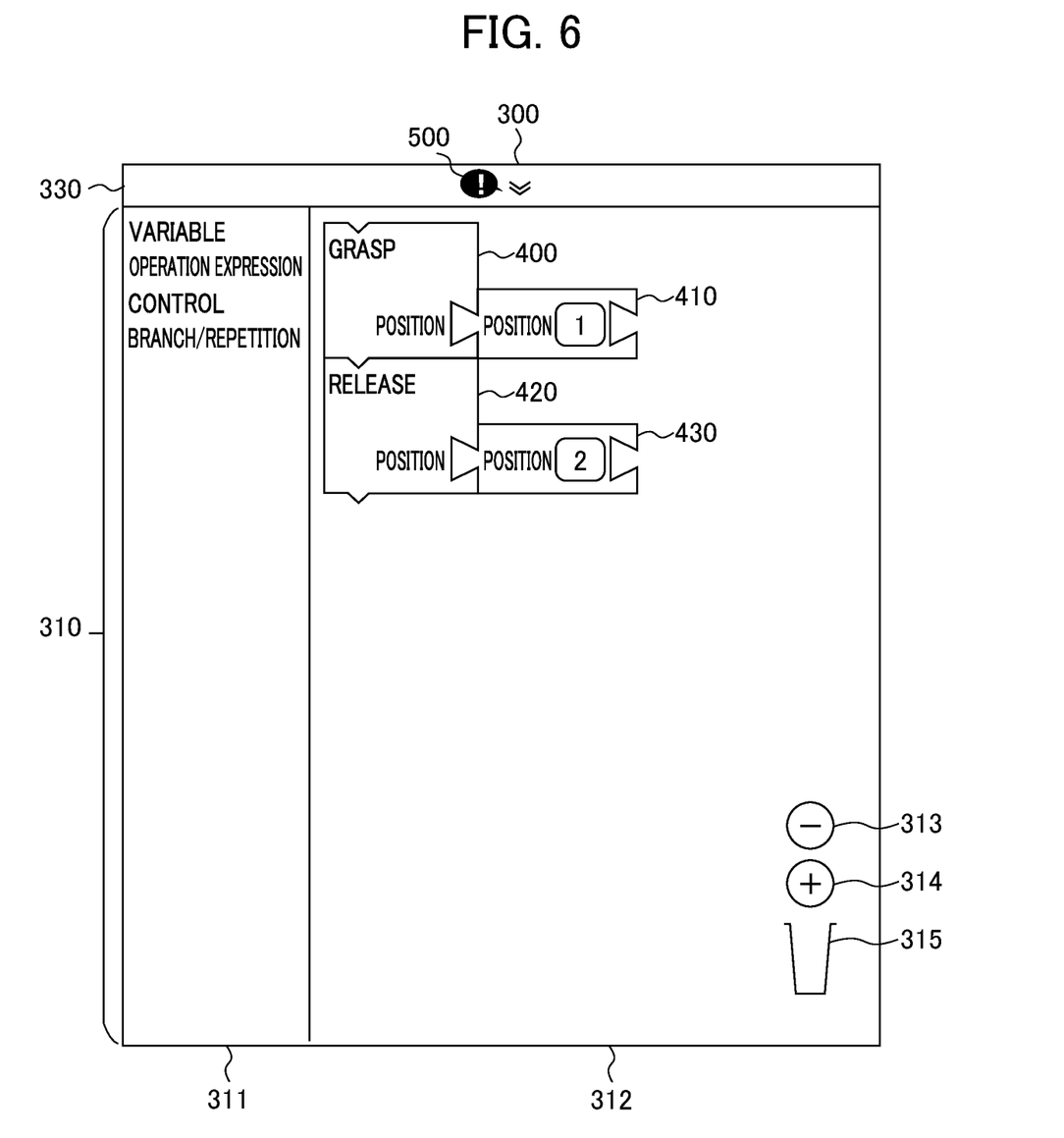
FIG. 6 shows an example of the user interface in which an advanced setting region is hidden.

FIG. 6 shows an example of the user interface 300 in which the advanced setting region 320 is hidden.

As shown in FIG. 6, by hiding the advanced setting region 320 in response to input operation from a user through the input unit 101, the display control unit 102 displays the user interface 300 including the programming region 310 and the setting display switching region 330. If the block 400 corresponding to the operation "grasp" is selected in response to input operation from the user through the input unit 101 while the advanced setting region 320 is hidden, for example, the display control unit 102 displays an icon 500 in the setting display switching region 330 indicating the presence of advanced setting in the block 400 corresponding to the operation "grasp." If a selected block does not require advanced setting, the display control unit 102 does not display the icon 500.

In this way, the user is allowed to see the presence of advanced setting in the selected operation unit block 400. When the user performs input operation through the input unit 101 to swipe the setting display switching region 330 downward, for example, the display control unit 102 displays the advanced setting region 320. This allows the user to check setting content or make setting in the operation unit block 400.

The display control unit 102 displays the icon 500 in the setting display switching region 330 if there is advanced setting in a selected operation unit block. However, this is not the only case but the display control unit 102 may change the color of the setting display switching region 330 or flashes the setting display switching region 330.

As described above, as a result of programming in the programming region 310 using a block defined on the basis of an operation unit such as "grasp" or "release" and setting of each operation unit block in the advanced setting region 320, it becomes possible to generate an easy-to-understand program in a simpler way and to improve the visibility of the program.

<Generation Process by Program Generation Unit 104>

Process of generating a motion program by the program generation unit 104 will be described next.

As described above, the program generation unit 104 generates a motion program for the robot 30 on the basis of an operation unit block input to the programming region 310 and setting content in each operation unit block set in the advanced setting region 320 of the user interface 300.

More specifically, for generating a motion program in a standard format (text format, for example), the program generation unit 104 analyzes motion content relating to an operation unit block corresponding to the operation "grasp" by the robot 30 on the basis of the block 400 corresponding to the operation "grasp" and setting content in the block 400 set in the advanced setting region 320, for example. Namely, in order to grasp the workpiece 10 at the position "1" set in the block 410 (the workpiece position "POSITION2" in FIG. 1B) using a hand of the robot 30 with the hand number at "1," the program generation unit 104 calculates the approach position "POSITION1" and the retreat position "POSITION3" in FIG. 1B on the basis of a move velocity, an approach velocity, etc. set in the advanced setting region 320.

Next, the program generation unit 104 analyzes motion content relating to an operation unit block corresponding to the operation "release" by the robot 30 on the basis of the block 420 corresponding to the operation "release" and setting content in the block 420 set in the advanced setting region 320. Namely, in order to open the hand of the robot 30 with the hand number "1" and release the workpiece 10 at the position "2" set in the block 430 (the workpiece installation position "POSITION5" in FIG. 1B), the program generation unit 104 calculates the approach position "POSITION4" and the retreat position "POSITION6" in FIG. 1B on the basis of a move velocity, an approach velocity, etc. set in the advanced setting region 320.

Then, on the basis of a result of the analysis, the program generation unit 104 generates a motion program in a standard format (text format) for running the robot 30 such as that shown in FIG. 1B using the program generated by setting the operation unit block.

As described above, for generating the motion program in a standard format (text format), the program generation unit 104 calculates an approach position, etc. for each operation unit block required for running the robot 30 on the basis of an operation unit block in the programming region 310 and setting content in the block in the advanced setting region 320. By doing so, even a user unskilled in programming is still allowed to generate a program for a robot easily.

<Processing Relating to Motion of Robot Programming Device 100>

Figure 7:
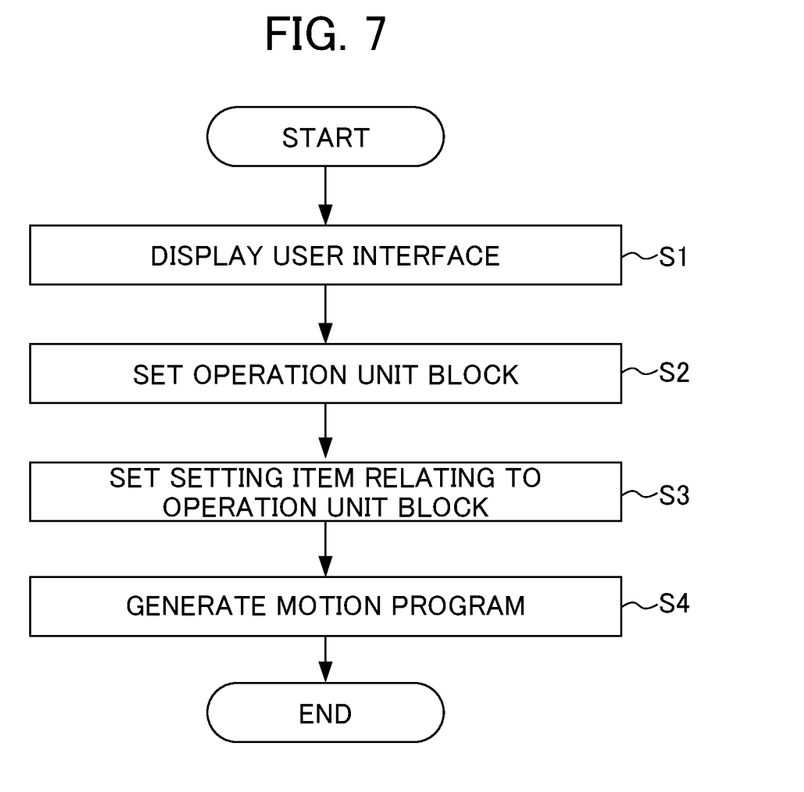
FIG. 7 is a flowchart describing the motion of the robot programming device in FIG. 4.

FIG. 7 is a flowchart describing the motion of the robot programming device 100 in FIG. 4.

In step S1, when the display control unit 102 receives an instruction to start programming on the basis of input operation from a user through the input unit 101, the display control unit 102 displays the user interface 300 on the display unit 103.

In step S2, the input unit 101 sets an operation unit block in the programming region 310 on the basis of the input operation from the user.

In step S3, on the basis of the input operation from the user, the input unit 101 sets a setting item in the advanced setting region 320 relating to the operation unit block input in step S2.

In step S4, on the basis of the operation unit block set in the programming region 310 and setting content relating to the block set in the advanced setting region 320, the program generation unit 104 analyzes content in the motion of the robot 30, and generates a motion program in a standard format (text format) for the robot 30 on the basis of a result of the analysis.

As described above, the robot programming device 100 according to the embodiment performs programming in the programming region 310 using an operation unit block corresponding to operation such as "grasp" or "release," and makes setting relating to the operation unit block in the advanced setting region 320. By doing so, the robot programming device 100 becomes capable of generating an easy-to-understand motion program for a robot in a simpler way by the programming using the operation unit block corresponding to the operation by the robot 30.

Using the operation unit block allows improvement of the visibility of the motion program for the robot 30 to facilitate maintenance of the program.

The robot programming device 100 makes advanced setting relating to an operation unit block in the advanced setting region 320 different from the programming region 310, and displays content in the setting, thereby allowing further improvement of the visibility of a program.

For generating a motion program for the robot 30, the robot programming device 100 calculates an approach position, etc. for each operation unit block required for running the robot 30 on the basis of an operation unit block set in the programming region 310 and setting content in the block set in the advanced setting region 320. By doing so, even a user unskilled in programming is still allowed to generate a motion program for the robot 30 easily.

While the embodiment has been described above, the robot programming device 100 is not limited to the foregoing embodiment but it includes modifications, improvements, etc. within a range in which the purpose is attainable.

For example, in the foregoing embodiment, the robot programming device 100 generates a motion program which may be a program in a standard format (text format, for example) from a program set using an operation unit block, and transmits the generated program to the robot controller 20. However, this is not the only case.

The robot controller 20 may possess some or all of the functions of the robot programming device 100. For example, the robot programming device 100 may transmit a program set using an operation unit block to the robot controller 20, and the robot controller 20 may generate a motion program which may be a program in a standard format (text format, for example) from the received program. In another case, the robot controller 20 may directly analyze a program set using an operation unit block.

For example, in the foregoing embodiment, the user interface 300 has the programming region 310, the advanced setting region 320, and the setting display switching region 330. However, this is not the only case.

Figure 8:
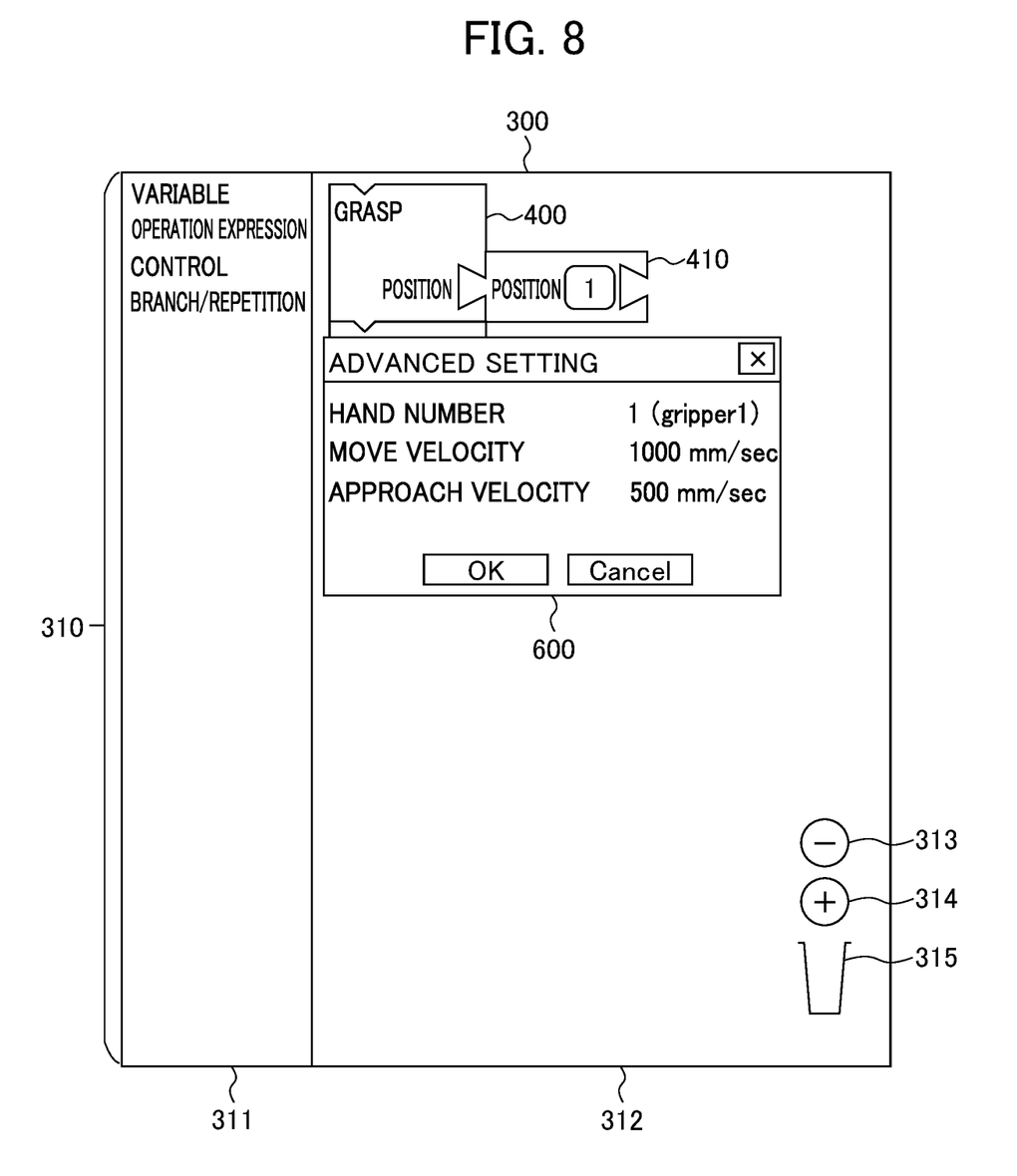
FIG. 8 shows an example of the user interface.

FIG. 8 shows an example of the user interface 300.

As shown in FIG. 8, the display control unit 102 displays only the programming region 310 as the user interface 300 on the display unit 103, for example. If the block 400 corresponding to the operation "grasp" is selected in response to input operation from a user through the input unit 101 and advanced setting is prepared for the selected block, the display control unit 102 may display setting content set in the block 400 corresponding to the operation "grasp" in a dialog box 600. By doing so, the programming region 310 can be displayed in a wider area.

For example, in the foregoing embodiment, in response to input of the block 400 corresponding to the operation "grasp" or input of the block 420 corresponding to the operation "release," the robot programming device 100 accepts input of setting in the block 410 defining the position "1" or input of setting in the block 430 defining the position "2." However, this is not the only case. In the case of FIG. 1A, for example, instead of setting the position "1" or the position "2," the robot programming device 100 may set "height," for example, relative to the workpiece position "POSITION2" and the workpiece installation position "POSITION5" of the workpiece 10.

Each function in the robot programming device 100 according to the embodiment can be realized by hardware, software, or a combination of hardware and software. Being realized by software means being realized by reading and execution of a program by a computer.

The program can be stored using various types of non-transitory computer-readable media and can be supplied to a computer. The non-transitory computer-readable media include various types of tangible storage media. Examples of the non-transitory computer-readable media include a magnetic storage medium (a flexible disk, magnetic tape, or a hard disk drive, for example), a magneto-optical storage medium (a magneto-optical disk, for example), a CD read-only memory (CD-ROM), a CD-R, a CD-R/W, and a semiconductor memory (a mask ROM, a programmable ROM (PROM), an erasable PROM (EPROM), a flash ROM, or a RAM, for example). The program can also be supplied to the computer using various types of transitory computer-readable media. Examples of the transitory computer-readable media include electrical signals, optical signals, and electromagnetic waves. The transitory computer-readable media can be used for supplying the program to the computer via wired communication paths such as electric wires and optical fibers, or wireless communication paths.

Steps describing the program stored in a storage medium certainly include processes to be performed in chronological order according to the order of the steps, and further include processes not to necessarily be performed in chronological order but to be performed in parallel or individually.

As another way of stating the foregoing, the robot programming device and the robot programming method of this disclosure can be embodied in a wide variety of ways having the configurations as follows:

(1) The robot programming device 100 of this disclosure is a robot programming device that performs programming using an operation unit block that is a block defined for each operation unit of the robot 30. The robot programming device 100 includes the display control unit 102 that displays the programming region 310 and the advanced setting region 320 on the display unit 103. The programming region 310 is a region for programming for running the robot 30 by defining the motion of the robot 30 on the basis of an operation unit, and setting an operation unit block corresponding to the operation unit. The advanced setting region 320 is a region for making setting relating to the operation unit block.

According to this robot programming device 100, programming using a block defined for each operation unit is performed in the programming region 310, and setting relating to the operation unit block is made in the advanced setting region 320. By doing so, an easy-to-understand program for a robot can be generated in a simpler way.

(2) The robot programming device 100 described in (1) may further include the program generation unit 104 that generates a motion program in a standard format (text format, for example) for running the robot 30 on the basis of the operation unit block set in the programming region 310 and setting content in the operation unit block set in the advanced setting region 320.

By doing so, the program based on the operation unit block generated by the robot programming device 100 becomes ready to run at any robot controller through conversion of the program to the motion program in a standard format (text format, for example).

This robot programming device 100 allows a user to generate a motion program for a robot easily, even if the user is unskilled in programming.

(3) In the robot programming device 100 described in (1) or (2), the display control unit 102 may accept an instruction to display setting content relating to any operation unit block, and display setting content relating to the operation unit block selected by the instruction in the advanced setting region 320.

This robot programming device 100 allows improvement of the visibility of a program using an operation unit block.

(4) The robot programming method of this disclosure is a robot programming method of performing programming using an operation unit block that is a block defined for each operation unit of the robot 30. The method is implemented by a computer including the display unit 103. The method includes: a step of displaying the programming region 310 and the advanced setting region 320 on the display unit 103; a step of defining the motion of the robot 30 on the basis of an operation unit and setting an operation unit block corresponding to the operation unit in the programming region 310; and a step of inputting setting relating to the operation unit block set in the programming region 310 to the advanced setting region 320.

According to this robot programming method, programming using a block defined for each operation unit is performed in the programming region 310, and setting relating to the operation unit block is made in the advanced setting region 320. By doing so, an easy-to-understand program for a robot can be generated in a simpler way.

EXPLANATION OF REFERENCE NUMERALS

20 Robot controller
30 Robot
100 Robot programming device
101 Input unit
102 Display control unit
103 Display unit
104 Programming generation unit

What is claimed is:

1. A robot programming device that performs programming using an operation unit block that is a block defined for each operation unit of a robot, the robot programming device comprising:
   a processor; and
   a display,
   the processor being configured to:
   display a user interface which has a programming region, an advanced setting region, and a setting display switching region on the display, the programming region being a region for programming for running the robot by defining motion of the robot on the basis of an operation unit, and setting an operation unit block corresponding to the operation unit, the advanced setting region being a region for making settings relating to a plurality of operation unit blocks, the advanced setting region being situated in a separate portion of the display from the programming region, and the setting display switching region being a region for switching between display and hiding of the advanced setting region, the setting display switching region being situated in a separate portion of the display from the programming region and the advanced setting region, the hiding of the advanced setting region results in the programming region being displayed in a larger area of the display, wherein
   the processor performs the switching between display and hiding of the advanced setting region in response to a user performing an input operation through the setting display switching region that is displayed adjacent to an end of the programming region,
   in a case of having performed switching to hiding of the advanced setting region, the processor displays the programming region and the setting display switching region on the display, and
   in a case of having performed switching to display of the advanced setting region, the processor displays, in addition to the programming region and the setting display switching region, the advanced setting region adjacent to an end of the setting display switching region on the display, the end of the setting display switching region being situated opposite to the programming region.

2. The robot programming device according to claim 1, wherein the processor generates a motion program in a standard format for running the robot on the basis of the operation unit block set in the programming region and setting content in the operation unit block set in the advanced setting region.

3. The robot programming device according to claim 1, wherein the processor accepts an instruction to display setting content relating to any operation unit block, and displays setting content relating to the operation unit block selected by the instruction in the advanced setting region.

4. A robot programming method of performing programming using an operation unit block that is a block defined for each operation unit of a robot, the method being implemented by a computer including a display and comprising:
   a step of displaying a user interface which has a programming region, an advanced setting region, and a setting display switching region on the display;
   a step of defining motion of the robot on the basis of an operation unit and setting an operation unit block corresponding to the operation unit in the programming region; and
   a step of inputting settings relating to a plurality of operation unit blocks set in the programming region to the advanced setting region, the advanced setting region being situated in a separate portion of the display from the programming region, and the setting display switching region being a region for switching between display and hiding of the advanced setting region, the setting display switching region being situated in a separate portion of the display from the programming region and the advanced setting region, the hiding of the advanced setting region results in the programming region being displayed in a larger area of the display, wherein
   the switching between display and hiding of the advanced setting region is performed in response to a user performing an input operation through the setting display switching region that is displayed adjacent to an end of the programming region,
   in a case of having performed switching to hiding of the advanced setting region, the programming region and the setting display switching region are displayed on the display, and
   in a case of having performed switching to display of the advanced setting region, in addition to the programming region and the setting display switching region, the advanced setting region is displayed adjacent to an end of the setting display switching region on the display, the end of the setting display switching region being situated opposite to the programming region.

* * * * *